United States Patent
Najmon

(10) Patent No.: US 7,210,290 B1
(45) Date of Patent: May 1, 2007

(54) REDUCED STALL CAPACITY TORQUE CONVERTER

(75) Inventor: Ralph L. Najmon, Avon, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/285,612

(22) Filed: Nov. 21, 2005

(51) Int. Cl.
  *F16H 41/26* (2006.01)
  *F16D 33/00* (2006.01)

(52) U.S. Cl. .................. 60/362; 416/197 C; 60/361

(58) Field of Classification Search ............. 60/330, 60/345, 361, 362, 364, 365; 416/180, 197 C
See application file for complete search history.

(56) References Cited

U.S. PATENT DOCUMENTS 2,755,628 A * 7/1956 Mamo .................... 60/356
3,014,430 A * 12/1961 Schneider ................ 416/180
5,966,934 A * 10/1999 Kosuge .................... 60/362
6,003,311 A * 12/1999 Takada et al. ............ 60/362
6,993,903 B2 * 2/2006 Shin ........................ 60/362

* cited by examiner

*Primary Examiner*—Thomas E. Lazo
(74) *Attorney, Agent, or Firm*—Dan L. Thompson

(57) ABSTRACT

The apparatus of the present invention provides a torque converter that is looser at stall than it is at 0.8 speed ratio. The torque converter includes a stator having a plurality of stator blades. The stator blades each define a primary leading edge, a trailing edge, and preferably include a flange defining a secondary leading edge. The stator blade flange extends away from each blade such that the secondary leading edge points generally to the primary leading edge of a preceding stator blade. In this manner, the secondary leading edge is designed at stall to catch flow coming past the primary leading edge of the upstream blade and to redirect the flow back out of the front of the stator. The secondary leading edge is further designed to hide in the wake of the primary leading edge at higher speed ratios.

16 Claims, 3 Drawing Sheets

REDUCED STALL CAPACITY TORQUE CONVERTER

TECHNICAL FIELD

The present invention relates to an apparatus for enhancing operating characteristics of a torque converter.

BACKGROUND OF THE INVENTION

A torque converter is a hydrodynamic unit that transfers torque between an engine and an automatic transmission. The torque converter generally includes an impeller (driving member), a turbine (a driven member), and a stator that are disposed in a housing full of working fluid. The impeller is generally disposed at a rear portion of the housing (away from the engine), and it turns with a crankshaft of an engine. The turbine is generally disposed at a front portion of the housing (near the engine), and is connected to a transmission input shaft. The turbine is free to rotate independently from the impeller.

The working fluid flows from the impeller toward the turbine in a radial outer portion of the torque converter. The working fluid then flows from the turbine back toward the impeller by way of the stator in a radial inner portion of the torque converter.

As is well known in the art, in order to optimize efficiency it is necessary to select an appropriate torque converter for a particular engine configuration and application. For example, torque converters have traditionally been matched to a diesel engine by selecting a torque converter with a stall curve that crosses the engine torque curve approximately 100 rpm above peak engine torque, and a 0.8 speed ratio curve that crosses the engine torque curve at the engine governed speed.

For some engines such as, for example, highly turbocharged diesel engines, it may be necessary to match the stall curve of the converter with the engine's "lug up" curve. As will be described in more detail, a lug up curve is approximately the engines naturally aspirated torque curve up to the engine speed at which the turbocharger spins up. To properly match the stall curve of a torque converter with an engine's lug up curve, it may be necessary to provide a torque converter that is "looser" at stall than it is at 0.8 speed ratio. A "tighter" torque converter is one that can absorb more torque (has a higher capacity), and a "looser" torque converter is one that can absorb less torque (has a lower capacity).

SUMMARY OF THE INVENTION

The apparatus of the present invention provides a torque converter that is "looser" at stall than it is at 0.8 speed ratio. The torque converter includes a turbine, a stator and an impeller. The stator includes an inner hub portion, an outer shell, and a plurality of stator blades disposed therebetween. The hub portion is connected via a one way clutch to a stator that is fixed to the transmission. The stator blades are connected to both the hub and the shell, and are circumferentially disposed at equal intervals. Each stator blade is connected to an inner surface of the shell and an outer surface of the hub.

The stator blades each define a primary leading edge, a trailing edge, a concave surface, and a convex surface. The concave surface of each stator blade is commonly referred to as the pressure surface, and the convex surface is commonly referred to as the suction surface. The stator blades also preferably include a flange extending from the concave surface and terminating in a secondary leading edge. When the working fluid flows around the stator blade, pressure acting on the concave surface is greater than that acting on the convex surface. The stator rotates due to the pressure difference between the sides of the stator blades.

The stator blade flange extends away from the concave surface of each blade such that the secondary leading edge extends generally in the direction of the primary leading edge of a preceding stator blade. In this manner, the secondary leading edge is designed at stall to catch flow coming past the primary leading edge of the upstream blade and to redirect the flow back out of the front of the stator toward the turbine.

The flow redirected out of the front of the stator by the secondary leading edge forms a large separation region or bubble. A separation bubble is a region at which the approaching flow recirculates in a direction which is reversed with respect to the mean flow. The separation bubble creates a region of restricted flow which limits the amount of working fluid passing through the stator toward the impeller at stall. This reduction of flow through the stator reduces torque converter capacity at stall.

The secondary leading edge is designed to hide in the wake of the primary leading edge at higher speed ratios. The secondary leading edge therefore only minimally affects the flow rate of the working fluid at higher speed ratios, and correspondingly the torque converter capacity at such higher speed ratios is not significantly altered.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
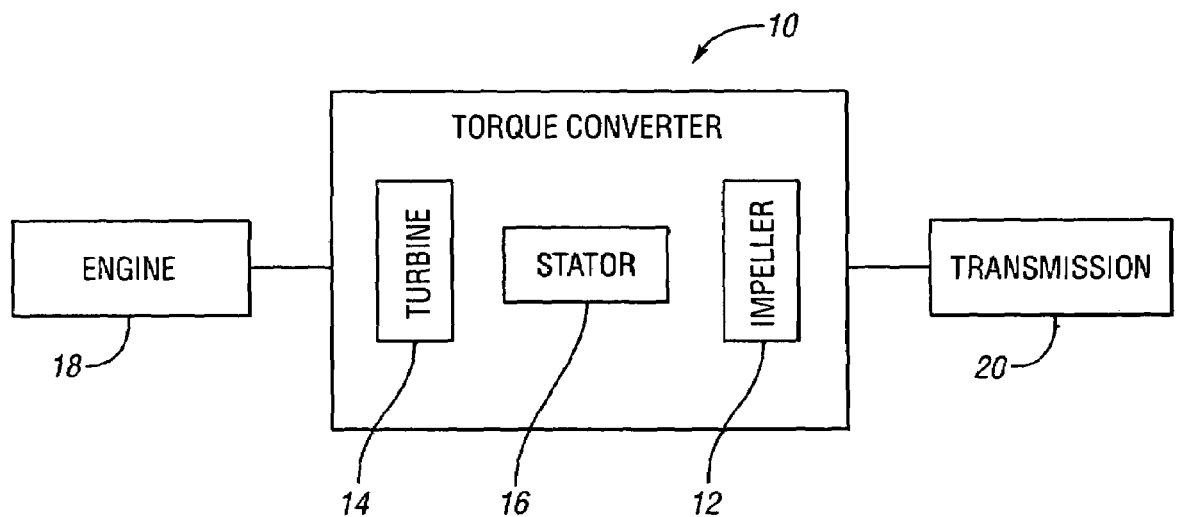
FIG. 1 is a schematic illustration of a torque converter connected to an engine and a transmission in accordance with an aspect of the invention.

As shown in FIG. 1, a torque converter 10 includes a pump impeller 12 (a driving member), a turbine runner 14 (a driven member), and a stator 16. An engine 18 and a transmission 20 are respectively disposed at opposing sides of the torque converter 10. The torque converter 10 further includes a housing member (not shown) attached to the impeller 12 such that a chamber full of working fluid (not shown) is formed therebetween.

The impeller 12 is connected to a crankshaft of the engine 18, and engine torque is transmitted from the impeller 12 to the turbine 14 through an operation of the working fluid. The turbine 14 is connected to an input shaft of the transmission 12 to transmit the engine torque to the transmission 12.

When the engine 18 is running, the rotating impeller 12 causes fluid to be directed outward toward the turbine vanes (not shown). When this occurs with sufficient force to overcome the resistance to rotation, the turbine 14 begins to turn, turning the transmission input shaft (not shown). The fluid flow exiting the turbine 14 is directed back into the impeller 12 by way of the stator 16. The stator 16 redirects the fluid flow from the turbine 14 to the impeller 12 in the same direction as impeller rotation, thereby reducing impeller torque and causing torque multiplication.

As is well known in the art, in order to optimize efficiency it is necessary to select an appropriate torque converter for a particular application and engine configuration. For example, torque converters have traditionally been matched to a diesel engine by selecting a torque converter with a stall curve that crosses the engine torque curve approximately 100 rpm above peak engine torque, and a 0.8 speed ratio curve that crosses the engine torque curve at the engine's governed speed. The engine's governed speed is the maximum speed at which the engine is designed to operate.

Some turbocharged diesel engines have a condition occurring at low speed at which they do not produce sufficient exhaust to spin up the turbochargers, and which therefore cannot be matched with a torque converter in the previously described traditional manner. The engine torque curve of such an engine is reduced to approximately its naturally aspirated torque curve until the engine speed increases enough to spin up the turbochargers. This reduced torque portion of the engine torque curve is commonly called a "lug up" curve.

To better illustrate the present invention, the engine 18 will hereinafter be described as a turbocharged diesel engine used in a fracturing rig, however, it should be appreciated that the apparatus of the present invention may be implemented with other engines as well. As is known by one skilled in the art, a "fracturing rig" is a stationary device used to improve the production rate and increase recoverable reserves of an oil well.

Figure 2:
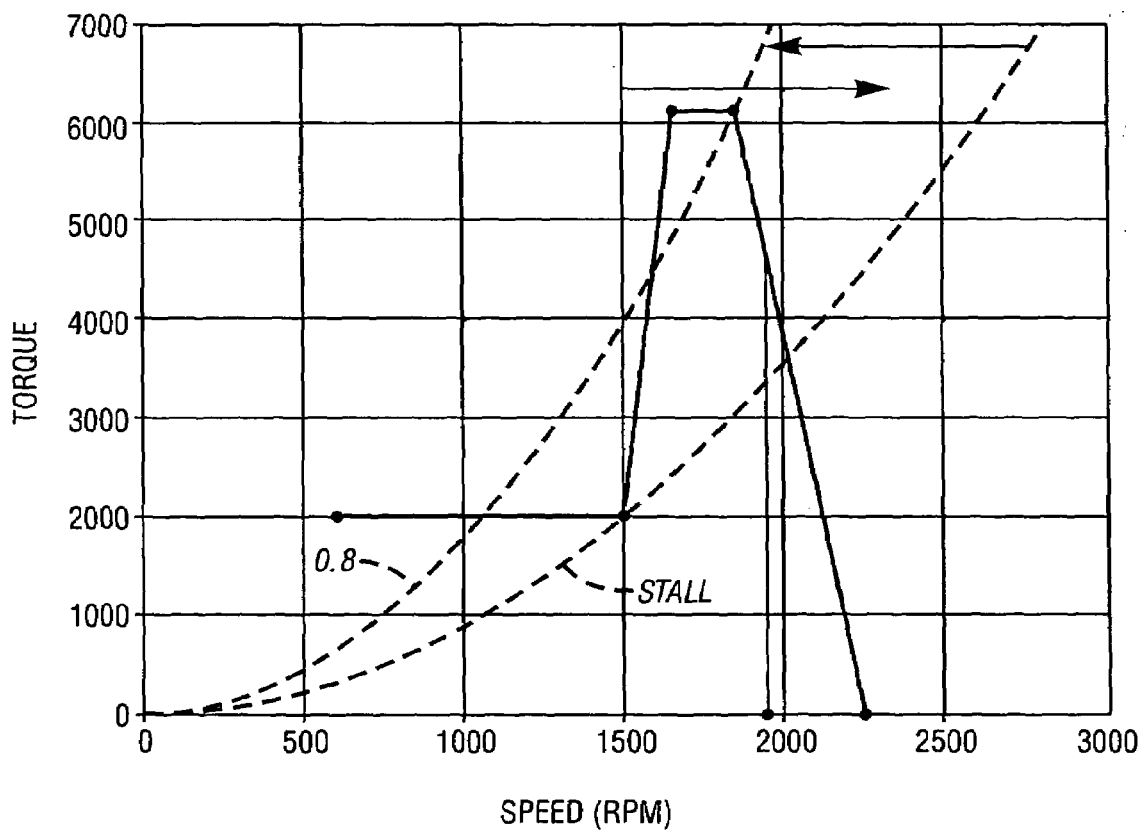
FIG. 2 is a graph showing the torque curve for the engine of FIG. 1, and the stall and 0.8 speed ratio curves for the torque converter of FIG. 1.

Referring to FIG. 2, a graph of torque (measured in ft-lbs) versus speed (measured in rpm) is shown. The solid line represents the torque curve of the engine 18 (shown in FIG. 1). As shown, the engine 18 produces 2,000 ft-lbs of torque from idle (600 rpm) up to 1,500 rpm. At 1,500 rpm, the turbochargers of the engine 18 come up to speed and the torque output increases quickly. The engine generates 6,100 ft-lbs of torque from 1,650 rpm up to the engine's governed speed (1,850 rpm). The portion of the engine torque curve between 600 rpm and 1,500 rpm is the lug up curve.

The previously described traditional method for matching an engine and a torque converter does not apply to the engine 18 (shown in FIG. 1). More precisely, matching a torque converter's stall curve with the engine 18 in the traditional manner could produce a lower stall point if the torque converter stall curve crosses the lug up curve of the engine 18. As is known in the art, a "stall point" is an operating point at which the engine at full throttle is being held by the torque converter at stall. To avoid producing a lower stall point that improperly matches a torque converter to the engine, the torque converter stall curve cannot cross the engine's lug up curve.

The dashed line of FIG. 2 labeled "stall" represents the stall curve for the torque converter 10 (shown in FIG. 1). The stall curve shows the torque capacity of a torque converter operating at stall and within an engine speed range. As shown in FIG. 2, the stall curve for the torque converter 10 meets the lug up curve of the engine 18 at 1,500 rpm but does not cross the lug up curve. As the stall curve of the torque converter 10 does not cross the lug up curve of the engine 18, the engine 18 can operate up to its governed speed without encountering a premature stall point.

The dashed line of FIG. 2 labeled "0.8" represents the 0.8 speed ratio curve for the torque converter 10 (shown in FIG. 1). The 0.8 speed ratio curve shows the torque capacity of a torque converter operating at a speed ratio of 0.8 and within a specified engine speed range. The 0.8 speed ratio curve of the torque converter 10 is optimally matched with the engine 18 (shown in FIG. 1) in the previously described traditional manner in which the 0.8 speed ratio curve is configured to cross the engine torque curve at the engine's governed speed (1,850 rpm).

It should be appreciated that the engine 18 (shown in FIG. 1) requires a torque converter that is "looser" at stall than it is at 0.8 speed ratio. In other words, while a typical torque converter gets "looser" with increasing speed ratio, a torque converter properly matched to engine 18 must get "tighter" with increasing speed ratio. A "tighter" torque converter is one that can absorb more torque (has a higher capacity), and a "looser" torque converter is one that can absorb less torque (has a lower capacity).

Referring again to FIG. 1, the stator 16 of the present invention is designed to reduce the stall capacity of the torque converter 10 without significantly impacting torque converter capacity at high speed ratios. The torque converter 10 of the present invention is therefore looser at stall than it is at 0.8 speed ratio, and can be matched with an engine such as the engine 18.

Figure 3:
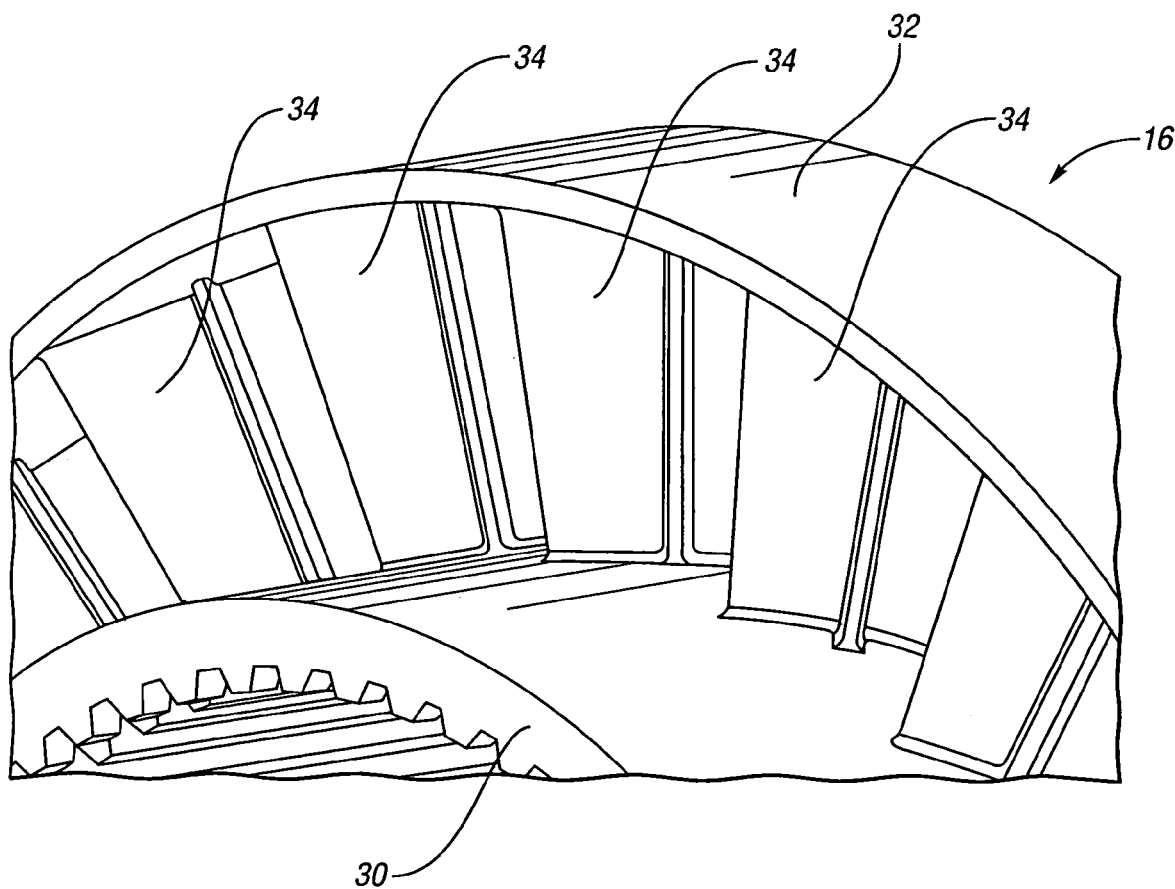
FIG. 3 is a detailed view of a stator of the torque converter of FIG. 1.

Referring to FIG. 3, the stator 16 is shown in more detail. The stator 16 includes an inner hub portion 30, an outer shell 32, and a plurality of stator blades 34 disposed therebetween. The hub portion 30 is connected to a stator shaft (not shown) that is fixed to the transmission 20. The stator blades 34 are connected to both the hub 30 and the shell 32, and are circumferentially disposed at constant intervals. Each stator blade 34 is connected to an inner surface of the shell 32 and an outer surface of the hub 30.

Figure 4:
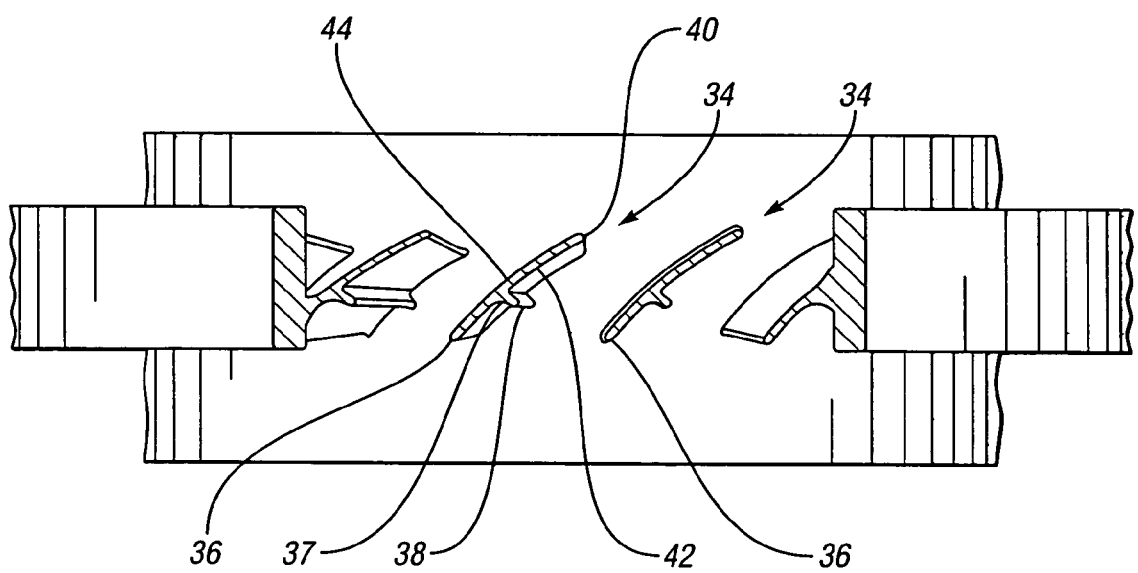
FIG. 4 is a detailed view of the stator blades of the stator of FIG. 3.

Referring to FIG. 4, the stator blades 34 each define a primary leading edge 36, a trailing edge 40, a concave surface 42, and a convex surface 44. The stator blades 34 also preferably include a flange 37 extending from the concave surface 42 and terminating in a secondary leading edge 38. When the working fluid flows around the stator blade 34, pressure acting on the concave surface 42 is greater than that acting on the convex surface 44. For this reason, the concave surface 42 is generally referred to as a high-pressure surface or a positive pressure side, and the convex surface 44 is generally referred to as a low-pressure surface or a negative pressure side. The stator 16 (shown in FIG. 3) reacts due to the pressure difference between the sides of the stator blades 34. Referring to FIGS. 1 and 4, the stator 16 is disposed between the impeller 12 and the turbine 14 such that the convex surface 44 substantially faces the turbine 14, and the concave surface 42 substantially faces the impeller 12.

As shown in FIG. 4, the flange 37 extends away from the positive pressure side of each blade 34 such that the secondary leading edge 38 points generally to, or extends in the direction of, the primary leading edge of a preceding stator blade. In this manner, the secondary leading edge 38 is designed at stall to catch flow coming past the primary leading edge of the upstream blade and to redirect the flow back out of the front of the stator 16 toward the turbine 14 (shown in FIG. 1).

Figure 5A:
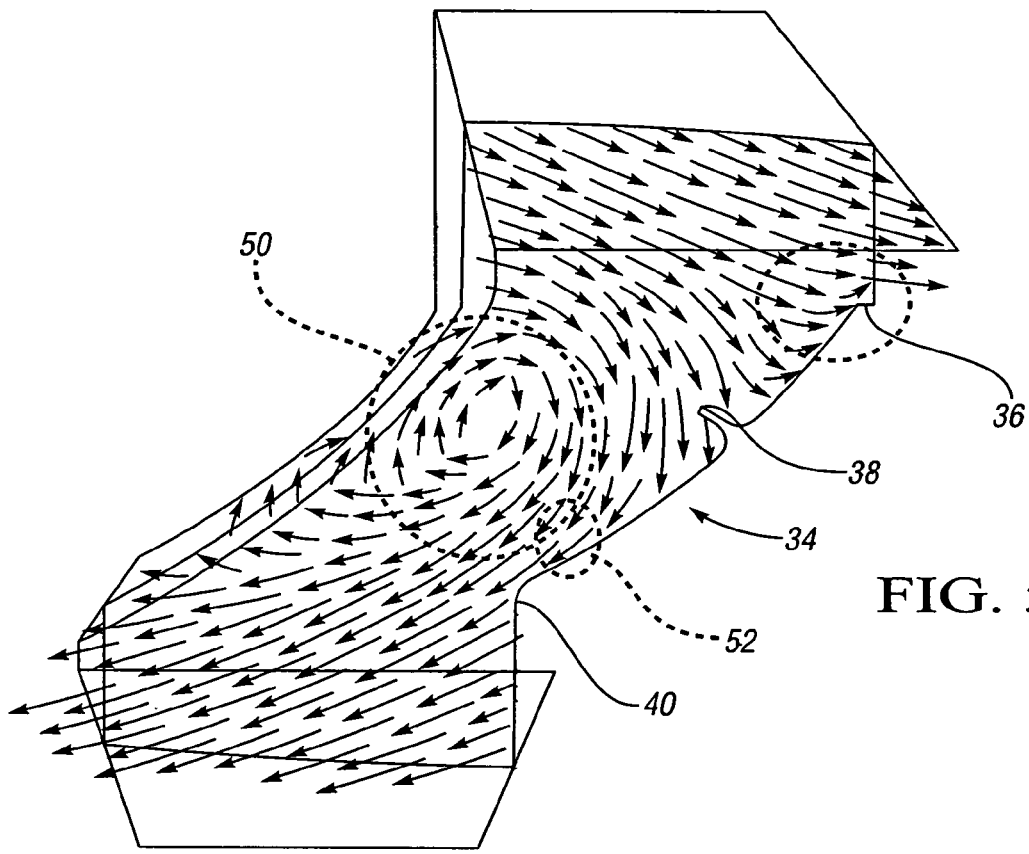
FIG. 5a is flow diagram showing the flow of working fluid across a stator blade of FIG. 4 while the torque converter of FIG. 1 is operating at stall.

FIG. 5a shows the flow of working fluid across the stator blade 34 (shown in FIG. 3) when the torque converter 10 (shown in FIG. 1) is operating at stall. The arrows indicate the flow direction of the working fluid. As shown, the flow redirected out of the front of the stator 16 (shown in FIG. 1) by the secondary leading edge 38 forms a large separation region or bubble 50. A separation bubble is a region at which the approaching flow recirculates in a direction which is reversed with respect to the mean flow. The separation bubble 50 creates a region 52 of restricted flow which limits the amount of working fluid passing through the stator 16 toward the impeller 12 (shown in FIG. 1) at stall. This reduction of flow through the stator 16 reduces torque converter capacity at stall.

Figure 5B:
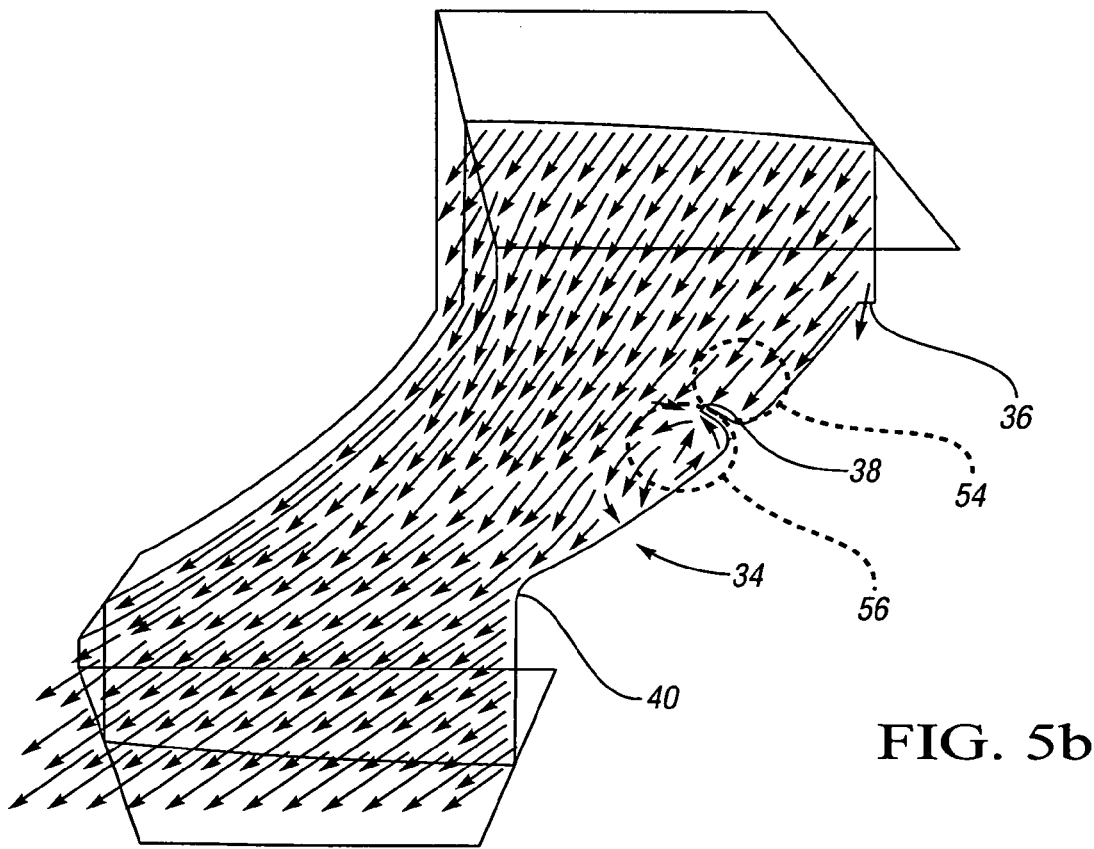
FIG. 5b is flow diagram showing the flow of working fluid across a stator blade of FIG. 4 while the torque converter of FIG. 1 is operating at 0.8 speed ratio.

The secondary leading edge 38 is designed to hide in the wake of the primary leading edge 36 at higher speed ratios. The secondary leading edge 38 therefore only minimally affects the flow rate of the working fluid at higher speed ratios, and correspondingly the torque converter capacity at such higher speed ratios is not significantly altered. FIG. 5b shows the flow of working fluid across the stator blade 34 when the torque converter 10 is operating at 0.8 speed ratio. It can be seen that the secondary leading edge 38 only slightly blocks the flow at region 54, and the resultant separation bubble 56 is therefore also relatively small.

While the best modes for carrying out the invention have been described in detail, those familiar with the art to which this invention relates will recognize various alternative designs and embodiments for practicing the invention within the scope of the appended claims.

The invention claimed is:

1. A stator for a torque converter comprising:
    a plurality of stator blades each defining:
        a primary leading edge at an end portion thereof;
        a trailing edge opposite said leading edge;
        a secondary leading edge between said primary leading edge and said trailing edge;
        a concave surface between said primary leading edge and said trailing edge; and
        a convex surface opposite said concave surface.

2. The stator of claim 1, wherein said plurality of stator blades each include a flange extending away from the concave surface and defining the secondary leading edge at an end portion.

3. The stator of claim 2, wherein said flange extends generally in the direction of the primary leading edge of an upstream stator blade.

4. The stator of claim 3, wherein said flange is adapted to catch flow coming past an upstream stator blade when the torque converter is operating at stall.

5. The stator of claim 4, wherein said flange is adapted to hide in the wake of the primary leading edge when the torque converter is operating at higher speed ratios.

6. The stator of claim 5, further comprising an inner hub portion attached to each of said plurality of stator blades.

7. The stator of claim 6, further comprising an outer shell attached to each of said plurality of stator blades such that said plurality of stator blades are disposed between said outer shell and said inner hub.

8. A stator for a torque converter comprising:
    a plurality of stator blades each defining:
        a primary leading edge at an end portion thereof;
        a trailing edge opposite said leading edge;
        a secondary leading edge between said primary leading edge and said trailing edge, wherein the secondary leading edge is adapted to catch flow coming past an upstream stator blade when the torque converter is operating at stall, and the secondary leading edge is adapted to hide in the wake of the primary leading edge when the torque converter is operating at higher speed ratios;
        a concave surface between said primary leading edge and said trailing edge; and
        a convex surface opposite said concave surface.

9. The stator of claim 8, wherein said plurality of stator blades each include a flange extending away from the concave surface and defining the secondary leading edge at an end portion.

10. The stator of claim 9, wherein said flange points generally to the primary leading edge of an upstream stator blade.

11. The stator of claim 10, further comprising an inner hub portion attached to each of said plurality of stator blades.

12. The stator of claim 11 further comprising an outer shell attached to each of said plurality of stator blades such that said plurality of stator blades are disposed between said outer shell and said inner hub.

13. A stator for a torque converter comprising:
    a plurality of stator blades each defining a leading edge at an end portion thereof, a trailing edge opposite said leading edge, a concave surface, and a convex surface opposite said concave surface; and
    a flange disposed between the primary leading edge and the trailing edge of each of said plurality of stator blades, said flange extending away from the concave surface of each of said plurality of stator blades, said flange defining a secondary leading edge at an end portion thereof;
    wherein the flange is adapted to catch flow coming past an upstream stator blade when the torque converter is operating at stall, and the flange is adapted to hide in the wake of the primary leading edge when the torque converter is operating at higher speed ratios.

14. The stator of claim 13, wherein said flange points generally to the primary leading edge of an upstream stator blade.

15. The stator of claim 14, further comprising an inner hub portion attached to each of said plurality of stator blades.

16. The stator of claim 15, further comprising an outer shell attached to each of said plurality of stator blades such that said plurality of stator blades are disposed between said outer shell and said inner hub.

* * * * *